United States Patent
Xue et al.

(10) Patent No.: US 11,109,294 B2
(45) Date of Patent: Aug. 31, 2021

(54) METHOD AND APPARATUS FOR DETERMINING SIGNAL STATUS OF TERMINAL DEVICE

(71) Applicant: Honor Device Co., Ltd., Shenzhen (CN)

(72) Inventors: Chao Xue, Xi'an (CN); Fei Luo, Xi'an (CN); Minghui Chen, Xi'an (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 224 days.

(21) Appl. No.: 16/466,904

(22) PCT Filed: Mar. 24, 2017

(86) PCT No.: PCT/CN2017/078155
§ 371 (c)(1),
(2) Date: Jun. 5, 2019

(87) PCT Pub. No.: WO2018/103234
PCT Pub. Date: Jun. 14, 2018

(65) Prior Publication Data
US 2019/0364477 A1   Nov. 28, 2019

(30) Foreign Application Priority Data
Dec. 8, 2016 (CN) .......................... 201611123236.X

(51) Int. Cl.
*H04W 36/14* (2009.01)
*H04W 36/00* (2009.01)
*H04W 88/06* (2009.01)

(52) U.S. Cl.
CPC ....... *H04W 36/14* (2013.01); *H04W 36/0085* (2018.08); *H04W 88/06* (2013.01)

(58) Field of Classification Search
CPC . H04W 36/14; H04W 36/0085; H04W 36/36; H04W 48/20; H04W 84/12; H04W 36/30; H04W 88/06
(Continued)

(56) References Cited

U.S. PATENT DOCUMENTS 8,630,637 B2    1/2014   Garg et al.
9,148,833 B1 *  9/2015   Singh ................ H04W 36/0094
(Continued)

FOREIGN PATENT DOCUMENTS

CN   1794681 A      6/2006
CN   102595544 A    7/2012
(Continued)

OTHER PUBLICATIONS

Machine Translation and Abstract of Chinese Publication No. CN1794681, Jun. 28, 2006, 19 pages.
(Continued)

*Primary Examiner* — Gbemileke J Onamuti
(74) *Attorney, Agent, or Firm* — Conley Rose, P.C.

(57) ABSTRACT

A method for determining a signal status of a terminal, comprising: when determining that data transmission quality parameters acquired in n first periods fall within a first range, determining, by a terminal device, that a signal status in a network access mode is on a first level; and then when determining that data transmission quality parameters acquired in m second periods after the n first periods fall within a first hysteresis range, keeping the signal status on the first level.

20 Claims, 5 Drawing Sheets

201

A terminal device acquires a data transmission quality parameter in a network access mode based on a specified period

202

When n first data transmission quality parameters fall within a first range, the terminal device determines that a signal status in the network access mode is on a first level

203

When m second data transmission quality parameters fall within a first hysteresis range, the terminal device keeps the signal status on the first level

(58) Field of Classification Search
USPC .......................................................... 370/252
See application file for complete search history.

(56) References Cited

U.S. PATENT DOCUMENTS

| | | | |
|---|---|---|---|
| 2011/0242986 A1* | 10/2011 | Balasubramanian | ........................ H04W 36/0058 370/242 |
| 2014/0162632 A1* | 6/2014 | Gajula | .................. H04W 24/02 455/426.1 |
| 2015/0282013 A1 | 10/2015 | Kim et al. | |
| 2015/0350983 A1 | 12/2015 | Kwok et al. | |
| 2017/0251401 A1* | 8/2017 | Comstock | ............. H04W 88/06 |

FOREIGN PATENT DOCUMENTS

| | | |
|---|---|---|
| CN | 103582060 A | 2/2014 |
| CN | 105792301 A | 7/2016 |
| CN | 106165490 A | 11/2016 |
| WO | 2005041612 A1 | 5/2005 |

OTHER PUBLICATIONS

Machine Translation and Abstract of Chinese Publication No. CN102595544, Jul. 18, 2012, 13 pages.
Machine Translation and Abstract of Chinese Publication No. CN103582060, Feb. 12, 2014, 29 pages.
Machine Translation and Abstract of Chinese Publication No. CN105792301, Jul. 20, 2016, 17 pages.
Foreign Communication From a Counterpart Application, PCT Application No. PCT/CN2017/078155, English Translation of International Search Report dated Aug. 30, 2017, 2 pages.
Foreign Communication From a Counterpart Application, PCT Application No. PCT/CN2017/078155, English Translation of Written Opinion dated Aug. 30, 2017, 4 pages.

* cited by examiner

```
                                                    ┌── 201
┌─────────────────────────────────────────────────────────────┐
│ A terminal device acquires a data transmission quality       │
│ parameter in a network access mode based on a specified      │
│ period                                                       │
└─────────────────────────────────────────────────────────────┘
                              │
                              ▼                     ┌── 202
┌─────────────────────────────────────────────────────────────┐
│ When n first data transmission quality parameters fall       │
│ within a first range, the terminal device determines that a  │
│ signal status in the network access mode is on a first level │
└─────────────────────────────────────────────────────────────┘
                              │
                              ▼                     ┌── 203
┌─────────────────────────────────────────────────────────────┐
│ When m second data transmission quality parameters fall      │
│ within a first hysteresis range, the terminal device keeps   │
│ the signal status on the first level                         │
└─────────────────────────────────────────────────────────────┘
```

FIG. 2

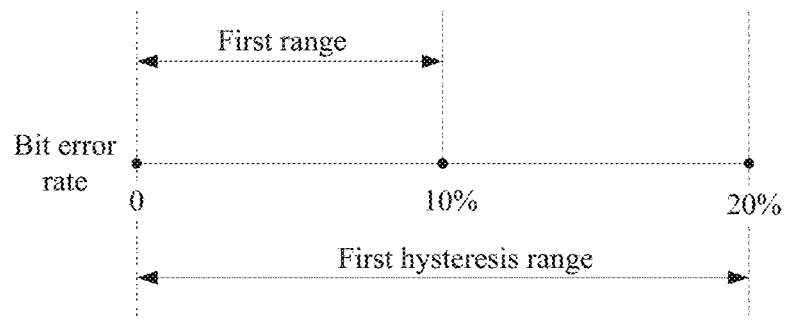

FIG. 2a

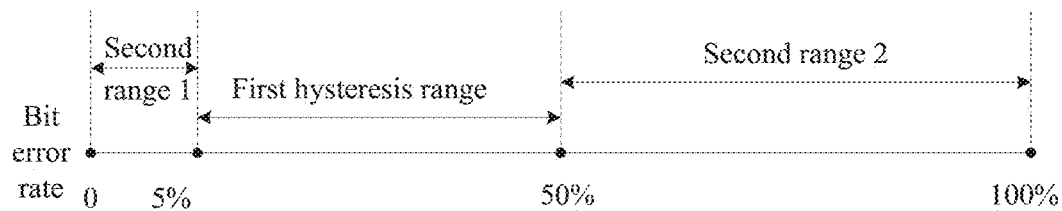

FIG. 2b

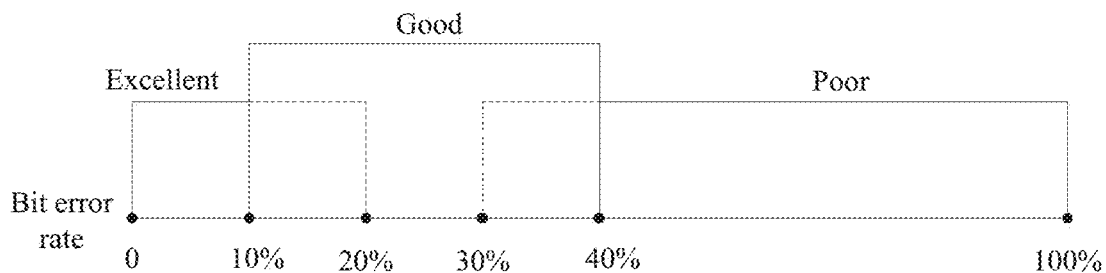

FIG. 2c

```
                                                    ~ 301
┌─────────────────────────────────────────────────────────┐
│ A terminal device determines a level of a first signal  │
│ status in a first network access mode and a level of a  │
│ second signal status in a second network access mode    │
└─────────────────────────────────────────────────────────┘
                            │
                            ▼                       ~ 302
┌─────────────────────────────────────────────────────────┐
│ The terminal device selects, based on the level of the  │
│ first signal status and the level of the second signal  │
│ status, the first network access mode from the first    │
│ network access mode and the second network access       │
│ mode to perform a service                               │
└─────────────────────────────────────────────────────────┘
```

FIG. 3

METHOD AND APPARATUS FOR DETERMINING SIGNAL STATUS OF TERMINAL DEVICE

CROSS-REFERENCE TO RELATED APPLICATIONS

This application is a National Stage of International Application No. PCT/CN2017/078155, filed on Mar. 24, 2017, which claims priority to Chinese Patent Application No. 201611123236.X, filed on Dec. 8, 2016, both of which are hereby incorporated by reference in their entireties.

TECHNICAL HELD

This application relates to the field of communications technologies, and in particular, to a method and an apparatus for determining a signal status of a terminal device.

BACKGROUND

Currently, a terminal device may perform a voice service in a plurality of different network access modes. A network access mode may be a Long Term Evolution (Long Term Evolution, LTE) mode or a Wireless Fidelity (Wireless Fidelity, Wi-Fi) mode. In a process of performing the voice service, the terminal device periodically monitors signal strengths in a plurality of optional network access modes, and determines, based on a signal strength in each network access mode, a level of a signal status in a corresponding network access mode. Different signal strengths correspond to different signal status levels. Usually, when the signal strength is higher than a specified threshold, the terminal device determines that the level of the signal status is excellent; when the signal strength is lower than the specified threshold, the terminal device determines that the level of the signal status is poor.

When the terminal device performs the voice service in a network access mode, and the terminal device determines that a level of a signal status in the current network access mode is lower than a level of a signal status in another network access mode, the terminal device switches the voice service from the current network access mode to the another network access mode. When a level of a signal status in the network access mode after the switching is lower than a level of a signal status in the network access mode before the switching, the terminal device switches the voice service between the two network access modes again. In other words, the terminal device switches the voice service between the two network access modes based on the levels of the signal statuses in the two network access modes.

In the process of performing the voice service by the terminal device, the signal strength changes continuously, and the terminal device switches the signal status to the excellent or poor level correspondingly based on a result of comparison between the signal strength and the specified threshold. Due to randomicity of the signal strength change, the signal strength probably changes continuously around the specified threshold. In this case, the terminal device frequently switches the signal status between the excellent level and the poor level, causing a ping-pong effect and further causing the terminal device to frequently switches the voice service between the two network access modes when the terminal device performs the voice service in a network access mode. Therefore, quality of the voice service is affected, and user experience is reduced.

SUMMARY

This application provides a method and an apparatus for determining a signal status of a terminal device, to resolve a problem in the prior art that when a terminal device performs a voice service, frequent switching of a signal status between levels causes a ping-pong effect and further affects quality of the voice service and reduces user experience.

Specific technical solutions provided by this application are as follows:

According to a first aspect, an embodiment of this application provides a method for determining a signal status of a terminal device, where the method includes:

acquiring, by a terminal device, a data transmission quality parameter in a network access mode based on a specified period; when determining that n first data transmission quality parameters fall within a first range, determining, by the terminal device, that a signal status in the network access mode is on a first level; and then when determining that m second data transmission quality parameters after the n first data transmission quality parameters fall within a first hysteresis range, keeping the signal status on the first level, where the data transmission quality parameter is used to indicate quality of data transmitted in the network access mode, the n first data transmission quality parameters are data transmission quality parameters acquired in n first periods, n is a positive integer, the m second data transmission quality parameters are data transmission quality parameters acquired in m second periods, m is a positive integer, the second period is a period after the first period, and the first hysteresis range is obtained through external extension based on the first range by using an endpoint of the first range as a start point.

In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of a service performed by the terminal device is finally ensured.

In a possible design, a duration of the period is shorter than 300 milliseconds. This can improve precision of acquiring the data transmission quality parameter by the terminal device, further improve precision of determining the level of the signal status by the terminal device based on the data transmission quality parameter, and finally improve quality of the service performed by the terminal device.

In a possible design, the terminal device may acquire the data transmission quality parameter continuously based on the duration of the period that is shorter than 300 milliseconds.

In a possible design, the terminal device acquires the data transmission quality parameter based on a period that is a first duration (shorter than 300 milliseconds) in a process of determining that there is a requirement for performing the service and performing the service, and acquires the data transmission quality parameter based on a period that is a second duration (longer than or equal to 300 milliseconds) at other times when there is no requirement for performing the service; or the terminal device acquires the data transmission quality parameter based on a duration of a period that is shorter than 300 milliseconds in a process of performing the service, and stops acquiring the data transmission quality parameter when the service is not performed.

The method can be used to reduce power consumption when the terminal device acquires the data transmission quality parameter.

In a possible design, the network access mode may be but is not limited to an LTE mode or a Wi-Fi mode.

In the method, the terminal device may determine levels of signal statuses in a plurality of network access modes, so that the terminal device subsequently selects a network access mode based on the levels of the signal statuses in the plurality of network access modes to perform the service.

In a possible design, the n first periods may be n consecutive periods, or may be n periods in a specified time period, or may be n periods in s periods, where s is an integer greater than or equal to n.

In a possible design, the m second periods may be m consecutive periods after the n first periods, or may be m periods in a specified time period after the n first periods, or may be m periods in t periods after the n first periods, where t is an integer greater than or equal to m, and n and m may be equal or unequal.

In a possible design, the data transmission quality parameter may be but is not limited to a signal strength, a bit error rate, a block error rate, or the like.

In the method, quality of data transmitted in the network access mode may be determined in a plurality of manners.

In a possible design, the signal status may include a plurality of levels, for example, excellent, good, general, and poor. When the data transmission quality parameter varies, a range of the data transmission quality parameter set by the terminal device for each level also varies.

For example, when the data transmission quality parameter is the bit error rate, the range of the data transmission quality parameter set by the terminal device for each level is as follows:

a range of the data transmission quality parameter set by the terminal device for an excellent level may be [0, 10%];

a range of the data transmission quality parameter set by the terminal device for a good level may be [10%, 40%]; and a range of the data transmission quality parameter set by the terminal device for a poor level may be [40%, 100%].

In the method, the terminal device may accurately determine the level of the signal status based on the range of the data transmission quality parameter set by the terminal device for each level.

In a possible design, when the m second data transmission quality parameters fall within a second range, the terminal device switches the signal status from the first level to a second level, where no intersection exists between the second range and the first hysteresis range.

In the method, the terminal device may switch the signal status between levels, so that the terminal device accurately determines the current level of the signal status.

In a possible design, when p third data transmission quality parameters fall within a second hysteresis range, the terminal device keeps the signal status on the second level, where the p third data transmission quality parameters are data transmission quality parameters acquired in p third periods, p is a positive integer, the third period is a period after the second period, and the second hysteresis range is obtained through external extension based on the second range by using an endpoint of the second range as a start point.

In the method, the terminal device determines a subsequent level of the signal status based on the second hysteresis range after determining that the signal status is on the second level. Because the second hysteresis range is obtained through extension based on the second range, the method can prolong a time of keeping the signal status on the second level, and when the data transmission quality parameter frequently changes around the endpoint of the second range, avoid frequent switching of the signal status determined by the terminal device, between two levels. In the method, a ping-pang effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of the service performed by the terminal device is finally ensured.

According to a second aspect, an embodiment of this application further provides a method for selecting a network access mode by a terminal device, where the method includes:

first determining, by a terminal device, a level of a first signal status in a first network access mode and a level of a second signal status in a second network access mode by performing the following steps:

the terminal device acquires a data transmission quality parameter in a target network access mode based on a specified period, where the data transmission quality parameter is used to indicate quality of data transmitted in the target network access mode, and the target network access mode is the first network access mode or the second network access mode;

when n first data transmission quality parameters fall within a first range, the terminal device determines that a signal status in the target network access mode is on a first level, where the n first data transmission quality parameters are data transmission quality parameters acquired in n first periods, and n is a positive integer; and when m second data transmission quality parameters fall within a first hysteresis range, the terminal device keeps the signal status on the first level, where the m second data transmission quality parameters are data transmission quality parameters acquired in m second periods, m is a positive integer, the second period is a period after the first period, and the first hysteresis range is obtained through external extension based on the first range by using an endpoint of the first range as a start point; and then selecting, by the terminal device based on the level of the first signal status and the level of the second signal status, the first network access mode from the first network access mode and the second network access mode to perform a service.

In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status avoided, and quality of the service performed by the terminal device is finally ensured.

In a possible design, a duration of the period is shorter than 300 milliseconds. This can improve precision of acquiring the data transmission quality parameter by the terminal device, further improve precision of determining the level of the signal status by the terminal device based on the data transmission quality parameter, and finally improve quality of the service performed by the terminal device.

In a possible design, the n first periods may be n consecutive periods, or may be n periods in a specified time period, or may be n periods in s periods, where s is an integer greater than or equal to n.

In a possible design, the m second periods may be m consecutive periods after the n first periods, or may be m periods in a specified time period after the n first periods, or may be m periods in t periods after the n first periods, where t is an integer greater than or equal to m, and n and m may be equal or unequal.

In a possible design, the data transmission quality parameter may be but is not limited to a signal strength, a bit error rate, a block error rate, or the like.

In the method, quality of data transmitted in the network access mode may be determined in a plurality of manners.

In a possible design, the signal status may include a plurality of levels, for example, excellent, good, general, and poor. When the data transmission quality parameter varies, a range of the data transmission quality parameter set by the terminal device for each level also varies.

For example, when the data transmission quality parameter is the bit error rate, the range of the data transmission quality parameter set by the terminal device for each level is as follows:

a range of the data transmission quality parameter set by the terminal device for an excellent level may be [0, 10%];

a range of the data transmission quality parameter set by the terminal device for a good level may be [10%, 40%]; and a range of the data transmission quality parameter set by the terminal device for a poor level may be [40%, 100%].

In the method, the terminal device may accurately determine the level of the signal status based on the range of the data transmission quality parameter set by the terminal device for each level.

In a possible design, when the m second data transmission quality parameters fall within a second range, the terminal device switches the signal status from the first level to a second level, where no intersection exists between the second range and the first hysteresis range.

In the method, the terminal device may switch the signal status between levels, so that the terminal device accurately determines the current level of the signal status.

In a possible design, when p third data transmission quality parameters fall within a second hysteresis range, the terminal device keeps the signal status on the second level, where the p third data transmission quality parameters are data transmission quality parameters acquired in p third periods, p is a positive integer, the third period is a period after the second period, and the second hysteresis range is obtained through external extension based on the second range by using an endpoint of the second range as a start point.

In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of the service performed by the terminal device is finally ensured.

In a possible design, the first network access mode is either of an LTE mode and a Wi-Fi mode, and the second network access mode is one of the LTE mode and the Wi-Fi mode other than the first network access mode. For example, when the first network access mode is the LTE mode, the second network access mode is the Wi-Fi mode; or when the first network access mode is the Wi-Fi mode, the second network access mode is the LTE mode.

In the method, it can be ensured that the terminal device selects a network access mode from a plurality of network access modes to perform the service, and quality of the service is finally ensured.

In a possible design, when determining that the level of the first signal status is higher than the level of the second signal status, the terminal device selects the first network access mode to perform the service.

In the method, the terminal device may perform the service in a network access mode in which a level of a signal status is high, and quality of the service is finally ensured.

In a possible design, when determining that the level of the first signal status is the same as the level of the second signal status, the terminal device selects the first network access mode of a higher priority to perform the service.

In the method, the terminal device may perform the service in a network access mode of a higher priority, and quality of the service is finally ensured.

In a possible design, when determining that the level of the second signal status is not in a specified level range and that the level of the first signal status is higher than the level of the second signal status, the terminal device selects the first network access mode to perform the service.

In the method, the terminal device may perform the service in a network access mode in which a level of a signal status is high, and quality of the service is finally ensured.

In a possible design, the terminal device may select, by performing the following steps, the first network access mode to perform the service:

the terminal device selects a target access point from a plurality of access points using the first network access mode, then accesses the target access point, and performs the service by using the target access point, where the target access point is an access point having a largest quality of service parameter, in the plurality of access points, and a quality of service parameter of any access point is used to indicate quality of the service performed by the terminal device by using the access point.

In the method, because the quality of service parameter of the target access point is the largest, quality of the service performed by the terminal device by using the access point may be the best. Therefore, quality of the service is ensured, and user experience is improved.

In a possible design, the terminal device determines whether the service is completed by using the target access point, and updates the quality of service parameter of the target access point based on a determining result. This specifically includes:

when determining that the service is completed by using the target access point, the terminal device adds a fixed value to the quality of service parameter of the target access point; otherwise, when determining that the service is not completed by using the target access point, the terminal device subtracts a fixed value from the quality of service parameter of the target access point.

In the method, by updating the quality of service parameter of the target access point, the terminal device may subsequently select an access point of better quality of service based on the quality of service parameter, so as to ensure quality of the service and improve user experience.

According to a third aspect, an embodiment of this application further provides a terminal device, where the terminal device has functions for implementing actions of the terminal device in the foregoing method embodiment. The functions may be implemented by hardware, or may be implemented by corresponding software executed by hardware. The hardware or software includes one or more modules corresponding to the foregoing functions.

In a possible design, a structure of the terminal device includes a plurality of units corresponding to the foregoing functions. The units may perform corresponding functions in the foregoing method example. For details, refer to detailed descriptions in the method example. Details are not described again herein.

In a possible design, a structure of the terminal device includes a processor and a memory, where the processor is configured to support the terminal device in performing corresponding functions in the foregoing method. The memory is coupled with the processor, and the memory stores a program instruction and data required by the terminal device.

According to a fourth aspect, an embodiment of this application further provides a mobile communications system, where the mobile communications system includes a terminal device and a plurality of access points, and the plurality of access points are a plurality of access points using a plurality of network access modes.

According to a fifth aspect, an embodiment of this application further provides a computer storage medium, where the computer storage medium stores a computer-executable instruction, and the computer-executable instruction is used to enable the computer to perform any one of the foregoing methods.

In the embodiments of this application, when determining that the data transmission quality parameters acquired in the n first periods fall within the first range, the terminal device determines that the signal status in the network access mode is on the first level; and then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status avoided, and quality of the service performed by the terminal device is finally ensured.

BRIEF DESCRIPTION OF DRAWINGS

FIG. 2 is a flowchart of a method for determining a signal status of a terminal device according to an embodiment of this application;

FIG. 2a is a schematic diagram of a range of a data transmission quality parameter for keeping a level of a signal status according to an embodiment of this application;

FIG. 2b is a schematic diagram of a range of a data transmission quality parameter for switching a signal status between levels according to an embodiment of this application;

FIG. 2c is a schematic diagram of a range of a data transmission quality parameter preset by a terminal device for a level of a signal status according to an embodiment of this application;

FIG. 3 is a flowchart of a method for selecting a network access mode by a terminal device according to an embodiment of this application;

DESCRIPTION OF EMBODIMENTS

Figure 1:
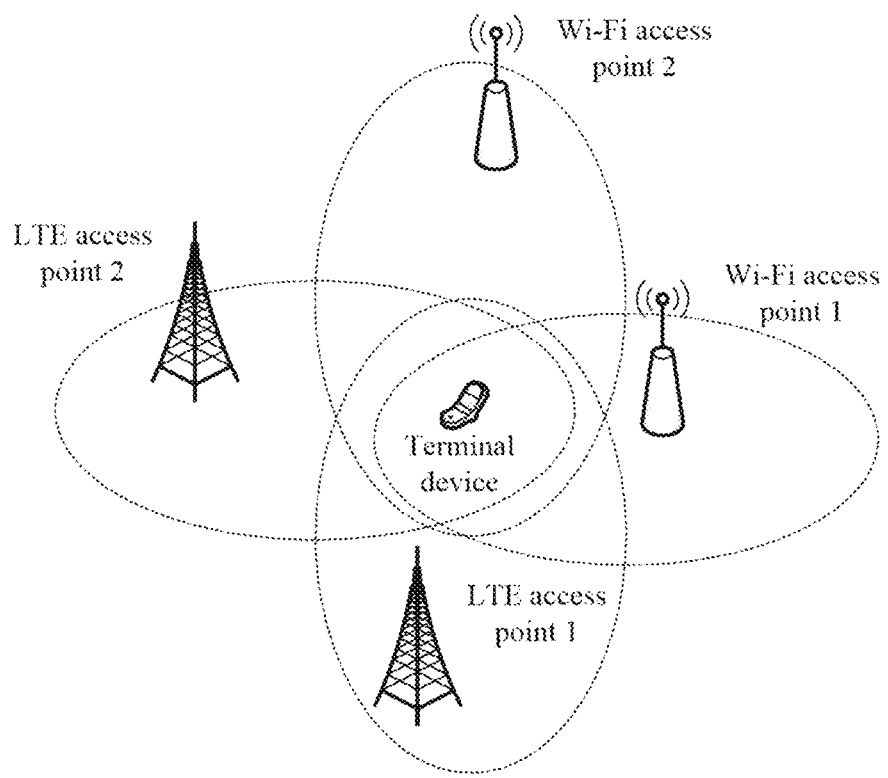
FIG. 1 is an architecture diagram of a mobile communications system according to an embodiment of this application.

The following further describes in detail this application with reference to accompanying drawings.

Embodiments of this application provide a method and an apparatus for determining a signal status of a terminal device, to resolve a problem in the prior art that when a terminal device performs a voice service, frequent switching of a signal status between levels causes a ping-pong effect and further affects quality of the voice service and reduces user experience. The method and the apparatus in this application are based on a same inventive concept. The method and the apparatus have similar principles for resolving the problem. Therefore, for implementations of the apparatus and the method, reference may be made to each other, and details of repeated parts are not described.

In the technical solutions of the embodiments of this application, when determining that data transmission quality parameters acquired in n first periods fall within a first range, a terminal device determines that a signal status in a network access mode is on a first level; and then when determining that data transmission quality parameters acquired in m second periods after the n first periods fall within a first hysteresis range, the terminal device continues to keep the signal status on the first level, where the first hysteresis range is obtained through external extension based on the first range by using an endpoint of the first range as a start point. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pang effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of a service performed by the terminal device is finally ensured.

The following describes some terms in this application to facilitate understanding by a person skilled in the art.

(1) The terminal device in the embodiments of this application, also referred to as user equipment (User Equipment, UE), is a device providing data connectivity for a user. For example, the terminal device is a handheld device having a wireless connection function, an in-vehicle device, a wearable device, a mobile station (Mobile Station, MS), another processing device connected to a wireless modem, or a mobile terminal performing communication with one or more core networks through an access network.

(2) The network access mode in the embodiments of this application is a mode of accessing a network when the terminal device performs the service. The network access mode may be but is not limited to an LTE mode or a Wi-Fi mode. For example, in the LTE mode, when performing the service, the terminal device accesses the network by accessing an access point using the LTE mode.

(3) The access point in the embodiments of this application is a device providing a wireless access service for the terminal device. Depending on different network access modes that are used, an access point type also varies. For example, the access point is an LTE access point using the LTE mode, or a Wi-Fi access point using the Wi-Fi mode. The LTE access point includes but is not limited to an evolved NodeB (evolved NodeB, eNB), a radio network controller (radio network controller, RNC), a NodeB (NodeB, NB), a base station controller (Base Station Controller, BSC), a base transceiver station (Base Transceiver Station, BTS), a home NodeB (for example, a Home evolved NodeB, or a Home NodeB, HNB), a baseband unit (BaseBand Unit, BBU), a micro-cell access point (Small-cell Access Point, SAP), a Worldwide Interoperability for Microwave Access (Worldwide Interoperability for Microwave Access, WiMAX) BS, or the like. For another example, the Wi-Fi access point includes but is not limited to a wireless access point (Wireless-Fidelity Access Point, Wi-Fi AP) or the like. In addition, the access points further include other access points using other network access modes. Details are not described herein.

(4) The data transmission quality parameter in the embodiments of this application is a parameter for indicating quality of data transmitted in any network access mode, and includes but is not limited to a signal strength, a bit error rate, a block error rate, or the like.

(5) A quality of service parameter in the embodiments of this application is a parameter for indicating quality of the service performed by the terminal device by using any access point. The quality of service parameter of any access point is updated according to whether the service performed by the terminal device by using the access point is completed. After the access point is deployed, the quality of service parameter of the access point is a preset initial value. When the terminal device completes the service by using the access point, the terminal device adds a fixed value to the quality of service parameter of the access point; otherwise, the terminal device subtracts a fixed value. That the terminal device completes the service by using the access point means that the terminal device is not handed over to another access point in a process of completing the service.

(6) The signal status in the network access mode in the embodiments of this application reflects quality of data transmitted in the network access mode. The signal status includes a plurality of different levels. For example, levels of the signal status may be excellent, good, general, poor, and the like in descending order of quality of transmitted data.

The first level and the second level in the embodiments of this application are both levels of the signal status, and the first level is different from the second level. The first level and the second level may be excellent, good, general, poor, and the like when the foregoing rule is used for classification. The first level and the second level may also be other levels when another rule is used for classification. This is not limited in this application.

(7) The service in the embodiments of this application may be but is not limited to a voice service, a video service, an audio service, or the like, and is not limited in this application.

(8) "A plurality of" in the embodiments of this application refers to two or more.

(9) Terms such as "first" arid "second" in the embodiments of this application are used for distinguishing description only, and cannot be understood as an indication or implication of relative significance or an indication or implication of order.

To describe the technical solutions of the embodiments of this application more clearly, the following describes in detail the method and apparatus for determining a signal status of a terminal device according to the embodiments of this application with reference to accompanying drawings.

FIG. 1 shows a possible mobile communications system to which a method for determining a signal status of a terminal device according to an embodiment of this application is applicable. The mobile communications system may support the terminal device in performing a service in two network access modes: an LTE mode and a Wi-Fi mode. An architecture of the mobile communications system includes a terminal device and a plurality of access points.

The plurality of access points are configured to provide a network access service for the terminal device, so that the terminal device performs the service by accessing the plurality of access points. The plurality of access points include a plurality of access points using a plurality of network access modes. There are a plurality of access points using each network access mode. For example, the plurality of access points shown in FIG. 1 include a plurality of Wi-Fi access points (a Wi-Fi access point 1 and a Wi-Fi access point 2) and a plurality of LTE access points (an LTE access point 1 and an LTE access point 2).

Before performing the service, the terminal device determines a level of a signal status in each network access mode in the plurality of network access modes, selects a first target network access mode from the plurality of network access modes based on levels of signal statuses in the plurality of network access modes, accesses a first target access point in a plurality of access points using the first target network access mode, and performs the service by using the first target access point. For example, when the first target network access mode is the Wi-Fi mode, the first target access point may be the Wi-Fi access point 1 shown in FIG. 1.

In a process of performing the service, the terminal device continues to determine the level of the signal status in each network access mode in the plurality of network access modes, and determines, based on the levels of the signal statuses in the plurality of network access modes, whether network access mode switching is required; and if no, the terminal device continues to select the first target network access mode from the plurality of network access modes, and continues to perform the service by using the first target access point; or if yes, the terminal device selects a second target network access mode from the plurality of network access modes, accesses a second target access point in a plurality of access points using the second target network access mode, and performs the service by using the second target access point. For example, when the second target access mode is the LTE mode, the second target access point may be the LTE access point 1 shown in FIG. 1.

For example, when the plurality of network access modes are the Wi-Fi mode and the LTE mode, the terminal device determines a level of a signal status in the Wi-Fi mode and a level of a signal status in the LTE mode before performing the service. When the terminal device determines that the level of the signal status in the Wi-Fi mode is higher than the level of the signal status in the LTE mode, the terminal device selects the Wi-Fi mode to perform the service, selects the Wi-Fi access point 1 from the plurality of Wi-Fi access points shown in FIG. 1, accesses the Wi-Fi access point 1, and performs the service by using the Wi-Fi access point 1.

The terminal device continues to determine the level of the signal status in the Wi-Fi mode and the level of the signal status in the LTE mode in the process of performing the service. When the terminal device determines that the level of the signal status in the Wi-Fi mode is higher than the level of the signal status in the LTE mode, the terminal device continues to select the Wi-Fi mode to perform the service, and continues to perform the service by using the Wi-Fi access point 1. When the terminal device determines that the level of the signal status in the Wi-Fi mode is lower than the level of the signal status in the LTE mode, the terminal device switches from the Wi-Fi mode to the LTE mode, that is, selects the LTE mode to perform the service, selects the target LTE access point 1 from the plurality of LTE access points shown in FIG. 1, accesses the LTE access point 1, and performs the service by using the LTE access point 1.

It should be noted that, the mobile communications system may support the terminal device in using a plurality of network access modes to perform the service, without being limited to the LTE mode or the Wi-Fi mode. The following embodiments of this application are described in detail by using an example in which the network access mode is the LTE mode or the Wi-Fi mode. Descriptions about other network access modes are not described in this application.

A method for determining a signal status of a terminal device according to an embodiment of this application is applied to the mobile communications system shown in FIG.1. Referring to FIG. 2, a specific procedure of the method includes the following steps.

Step 201: A terminal device acquires a data transmission quality parameter in a network access mode based on a specified period, where the data transmission quality parameter is used to indicate quality of data transmitted in the network access mode.

Optionally, a duration of the period is shorter than 300 milliseconds. This can improve precision of acquiring the data transmission quality parameter by the terminal device, further improve precision of determining a level of a signal status by the terminal device based on the data transmission quality parameter, and finally improve quality of a service performed by the terminal device.

Optionally, the terminal device may perform step 201 by using the following three methods.

First method: The terminal device may acquire the data transmission quality parameter continuously based on the duration of the period that is shorter than 300 milliseconds.

Second method: The terminal device acquires the data transmission quality parameter based on a period that is a first duration (shorter than 300 milliseconds) in a process of determining that there is a requirement for performing the service and performing the service, and acquires the data transmission quality parameter based on a period that is a second duration (longer than or equal to 300 milliseconds) at other times when there is no requirement for performing the service.

Third method: The terminal device acquires the data transmission quality parameter based on a duration of a period that is shorter than 300 milliseconds in a process of performing the service, and stops acquiring the data transmission quality parameter when the service is not performed.

The last two methods can be used to reduce power consumption when the terminal device performs step 201.

Optionally, the network access mode may be but is not limited to an LTE mode or a Wi-Fi mode.

Optionally, the data transmission quality parameter may be but is not limited to a signal strength, a hit error rate, a block error rate, or the like.

When the data transmission quality parameter is the signal strength, if the data transmission quality parameter is larger, it indicates that quality of data transmitted by the terminal device in the network access mode is better, that is, the level of the signal status of the terminal device in the network access mode is higher; otherwise, the level is lower. When the data transmission quality parameter is the bit error rate or the block error rate, if the data transmission quality parameter is larger, it indicates that quality of data transmitted by the terminal device in the network access mode is poorer, that is, the level of the signal status of the terminal device in the network access mode is lower; otherwise, the level is higher. Specifically, the signal strength may be indicated by a received signal strength indicator (Received Signal Strength Indication, RSSI).

Step 202: When n first data transmission quality parameters fall within a first range, the terminal device determines that a signal status in the network access mode is on a first level, where the n first data transmission quality parameters are data transmission quality parameters acquired in n first periods, and n is a positive integer.

The signal status may include a plurality of levels, for example, excellent, good, general, and poor. When the data transmission quality parameter varies, a range of the data transmission quality parameter set by the terminal device for each level also varies. For example, when the data transmission quality parameter is the bit error rate, the range of the data transmission quality parameter set by the terminal device for each level is as follows:

a range of the data transmission quality parameter set by the terminal device for an excellent level may be [0, 10%];

a range of the data transmission quality parameter set by the terminal device for a good level may be [10%, 40%]; and a range of the data transmission quality parameter set by the terminal device for a poor level may be [40%, 100%].

Optionally, the n first periods may be n consecutive periods, or may be n periods in a specified time period, or may be n periods in s periods, where s is an integer greater than or equal to n.

Step 202 performed by the terminal device to determine that the signal status is on the first level is hereinafter described by using an example in which the data transmission quality parameter is the bit error rate.

EXAMPLE 1

When the terminal device determines that the first range that the n first data transmission quality parameters fall within is [40%, 100%], the terminal device determines that the first level is poor.

EXAMPLE 2

When the terminal device determines that the first range that the n first data transmission quality parameters fall within is [10%, 40%], the terminal device determines that the first level is good.

EXAMPLE 3

When the terminal device determines that the first range that the n first data transmission quality parameters fall within is [0, 10%], the terminal device determines that the first level is excellent.

Optionally, the method for determining, by the terminal device, a correspondence between the first range and the first level based on the range of the data transmission quality parameter preset for each level when the data transmission quality parameter is the signal strength is similar to the method when the data transmission quality parameter is the bit error rate. Details are not described again herein.

Step 203: When m second data transmission quality parameters fall within a first hysteresis range, the terminal device keeps the signal status on the first level, where the m second data transmission quality parameters are data transmission quality parameters acquired in m second periods, m is a positive integer, the second period is a period after the first period, and the first hysteresis range is obtained through external extension based on the first range by using an endpoint of the first range as a start point.

Optionally, when the terminal device obtains the first hysteresis range based on the first range, when the first range has only one endpoint, the first hysteresis range is obtained through external extension based on the only one endpoint of the first range; or when the first range has two endpoints, the first hysteresis range is obtained through external extension based on at least one of the two endpoints of the first range. A specific range of external extension based on the endpoint of the first range may be preset, or may be set by the terminal device based on an actual scenario.

Optionally, the m second periods may be m consecutive periods after the n first periods, or may be m periods in a specified time period after the n first periods, or may be in periods in t periods after the n first periods, where t is an integer greater than or equal to m, and n and m may be equal or unequal.

After determining that the signal status is on the first level in the foregoing step 202, when the terminal device performs step 203, the example 3 in which the first level is excellent is still used merely for detailed description.

When the first level is excellent, the corresponding first range is [0, 10%]. The first hysteresis range [0, 20%] is obtained through external extension based on the first range by using an endpoint 10% as a start point. The first range and the first hysteresis range are shown in FIG. 2*a*. When the terminal device determines that the m second data transmission quality parameters fall within the first hysteresis range (that is, [0, 20%] in FIG. 2*a*), the terminal device keeps the signal status on the first level, that is, excellent.

In the method, when the m data transmission quality parameters change around 10% frequently, because the first hysteresis range includes values around 10%, frequent switching of the signal status between the excellent level and the good level is avoided. Further, when the terminal device selects a network access mode based on levels of signal statuses in a plurality of network access modes, frequent switching between the network access modes that is caused by frequent switching of the signal status is avoided, and quality of the service performed by the terminal device is finally ensured.

Optionally, when the first level is poor, and the corresponding first range is [40%, 100%], the first hysteresis range [30%, 100%] may be obtained by using the foregoing method; or when the first level is good, and the corresponding first range is (10%, 40%), the first hysteresis range (5%, 40%), (10%, 50%), or (5%, 50%) may be obtained by using the foregoing method.

Optionally, after the terminal device determines that the signal status is on the first level in the foregoing step 202, when the m second data transmission quality parameters fall within a second range, the terminal device switches the signal status from the first level to a second level, where no intersection exists between the second range and the first hysteresis range.

The foregoing example in which the first level is good and the corresponding first hysteresis range is (5%, 50%) is still used merely for detailed description:

No intersection exists between a second range 1 [0, 5%] and the first hysteresis range (5%, 50%) and between a second range 2 [50%, 100%) and the first hysteresis range (5%, 50%), as shown in FIG. 2*b*. Therefore, both the second range 1 and the second range 2 may be considered as the second range. When the terminal device determines that the m second data transmission quality parameters fall within the second range 1 shown in FIG. 2*b*, the terminal device determines that the level of the signal status excellent (that is, the second level); in this case, the terminal device switches the signal status from the first level to the second level, that is, switches the signal status from excellent to good. When the terminal device determines that the m second data transmission quality parameters fall within the second range 2 shown in FIG. 2*b*, the terminal device determines that the level of the signal status is poor (that is, the second level); in this case, the terminal device switches the signal status from the first level to the second level, that is, switches the signal status from good to poor.

Optionally, when the terminal device determines that u second data transmission quality parameters in the m second data transmission quality parameters fall within the second range 1 shown in FIG. 2*b* and other m-u second data transmission quality parameters fall within the second range 2 shown in FIG. 2*b*, the terminal device continues to keep the signal status on the first level (that is, continues to keep good), where u is a positive integer less than m.

Optionally, when the first level is excellent, and the corresponding first hysteresis range is [0, 20%], the corresponding second range may be (20%, 40%) or [40%, 100%], and correspondingly, the terminal device switches the signal status from the excellent level to the good or poor level (that is, switches the signal status from the first level to the second level); or when the first level is poor, and the corresponding first hysteresis range is [30%, 100%], the corresponding second range may be (10%, 30%) or [0, 10%], and correspondingly, the terminal device switches the signal status from the poor level to the good or excellent level (that is, switches the signal status from the first level to the second level).

Optionally, after the terminal device switches the signal status from the first level to the second level, when p third data transmission quality parameters acquired by the terminal device in subsequent p third periods fall within a second hysteresis range, the terminal device keeps the signal status on the second level. The p third data transmission quality parameters are data transmission quality parameters acquired in the p third periods, p is a positive integer, the third period is a period after the second period, and the second hysteresis range is obtained through external extension based on the second range by using an endpoint of the second range as a start point.

The method for determining, by the terminal device, the second hysteresis range based on the second range and further keeping the signal status on the second level based on the second hysteresis range is the same as the method for determining, by the terminal device, the first hysteresis range based on the first range and further keeping the signal status on the first level based on the first hysteresis range. Details are not described again herein.

As can be learned from specific analysis on the first level and the second level, both the first level and the second level may be any one of the excellent, good, and poor levels, but the first level and the second level are different levels, that is, cannot be a same level simultaneously. The first level and the second level may also be a plurality of levels other than the foregoing three levels. Details are not described again herein.

In the method for determining a signal status of a terminal device according to this embodiment of this application, when determining that the data transmission quality parameters acquired in the n first periods fall within the first range, the terminal device determines that the signal status in the network access mode is on the first level; and then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of the service performed by the terminal device is finally ensured.

Optionally, in the method, the terminal device may determine each signal status level in a plurality of signal status levels, or determine some specified signal status levels in the plurality of signal status levels.

For example, in a scenario in which the terminal device determines a level of a signal status in the Wi-Fi mode, when the data transmission quality parameter is a bit error rate, a range of the data transmission quality parameter set by the terminal device for each level of the signal status in the Wi-Fi mode is shown in FIG. 2c:

a range of the data transmission quality parameter set by the terminal device for an excellent level may be [0, 10%];

a range of the data transmission quality parameter set by the terminal device for a good level may be [10%, 40%]; and a range of the data transmission quality parameter set by the terminal device for a poor level may be [40%, 100%].

In the foregoing scenario, when the terminal device determines the level of the signal status in the Wi-Fi mode by using a conventional method, when the terminal device determines that the data transmission quality parameter falls within [0, 10%] in FIG. 2c, the terminal device determines that the level of the signal status in the Wi-Fi mode is excellent. Then when the data transmission quality parameter changes between 8% and 12% frequently, the terminal device frequently switches the signal status between the excellent level and the good level in the Wi-Fi mode.

Obviously, the conventional method causes the terminal device to frequently switch the signal status in the Wi-Fi mode, causing a ping-pang effect. Therefore, in a scenario in which the terminal device selects a network access mode based on levels of signal statuses in a plurality of network access modes, frequent switching between the network access modes is caused by frequent switching of the signal status. Therefore, quality of a voice service is affected, and user experience is reduced.

However, still in the foregoing scenario, the method for determining a signal status of a terminal device according to the embodiment shown in FIG. 2 may be used to resolve the problem of frequent switching of the signal status that is caused by the conventional method. For example, when data transmission quality parameters acquired in five first periods fall within [0, 10%] in FIG. 2c, the terminal device determines that the level of the signal status in the Wi-Fi mode is excellent; and when data transmission quality parameters acquired in five second periods after the five first periods fall within [0, 20%] in FIG. 2c, the terminal device keeps the signal status on the excellent level in the Wi-Fi mode.

Obviously, in the method provided by this embodiment of this application, when the data transmission quality parameter changes between 8% and 12% frequently, although the range that is set for the excellent level is exceeded, because the set range is extended, the change of the data transmission quality parameter is within the extended range. The terminal device still keeps the signal status on the excellent level in the Wi-Fi mode, and frequent switching of the signal status between the excellent level and the good level in the Wi-Fi mode is avoided.

In conclusion, when the data transmission quality parameter changes frequently around the endpoint of the preset range, the method for determining a signal status of a terminal device according to this embodiment of this application can avoid frequent switching of the signal status determined by the terminal device, between two levels. Obviously, in the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of the service performed by the terminal device is finally ensured.

Based on the foregoing embodiment, an embodiment of this application further provides a method for selecting a network access mode by a terminal device. The method is applicable to the mobile communications system shown in FIG. 1. Referring to FIG. 3, a specific procedure of the method includes the following steps.

Step 301: A terminal device determines a level of a first signal status in a first network access mode and a level of a second signal status in a second network access mode.

The terminal device implements step 301 by using the method for determining a signal status of a terminal device in the embodiment shown in FIG. 2. Specifically, the method includes:

the terminal device acquires a data transmission quality parameter in a target network access mode based on a specified period, where the data transmission quality parameter is used to indicate quality of data transmitted in the target network access mode, and the target network access mode is the first network access mode or the second network access mode;

when n first data transmission quality parameters fall within a first range, the terminal device determines that a signal status in the target network access mode is on a first level, where the n first data transmission quality parameters are data transmission quality parameters acquired in n first periods, and n is a positive integer; and when m second data transmission quality parameters fall within a first hysteresis range, the terminal device keeps the signal status on the first level, where the m second data transmission quality parameters are data transmission quality parameters acquired in m second periods, m is a positive integer, the second period is a period after the first period, and the first hysteresis range is obtained through external extension based on the first range by using an endpoint of the first range as a start point.

Optionally, after the terminal device determines that the signal status is on the first level, when the m second data transmission quality parameters fall within a second range, the terminal device switches the signal status from the first level to a second level, where no intersection exists between the second range and the first hysteresis range.

Optionally, after the terminal device switches the signal status from the first level to the second level, when p third data transmission quality parameters acquired by the terminal device in subsequent p third periods fall within a second hysteresis range, the terminal device keeps the signal status on the second level. The p third data transmission quality parameters are data transmission quality parameters acquired in the p third periods, p is a positive integer, the third period is a period after the second period, and the second hysteresis range is obtained through external extension based on the second range by using an endpoint of the second range as a start point.

In the process of determining, by the terminal device by performing the foregoing step, the level of the first signal status and the level of the second signal status, that is, the process of determining the level of the signal status in the target network access mode, the method and specific examples of determining, by the terminal device, the first level based on the first range and keeping the first level based on the first hysteresis range, or switching the signal status from the first level to the second level based on the second range are the same as those described in step 201 to step 203 in FIG. 2. Details are not described again herein.

Optionally, in the foregoing step, a duration of the period is shorter than 300 milliseconds. This can improve precision of acquiring the data transmission quality parameter by the terminal device, further improve precision of determining the level of the signal status based on the data transmission quality parameter, and therefore improve quality of a service performed by the terminal device.

Optionally, in the foregoing step, the terminal device may acquire the data transmission quality parameter based on the duration of the period that is shorter than 300 milliseconds; or the terminal device acquires the data transmission quality parameter based on the duration of the period that is shorter than 300 milliseconds in a process of determining that there is a requirement for performing the service and performing the service.

Optionally, the data transmission quality parameter may be but is not limited to a signal strength, a bit error rate, a block error rate, or the like. For a relationship between a value of the data transmission quality parameter and quality of data transmitted in the target network access mode, refer to detailed descriptions of the data transmission quality parameter in the foregoing embodiment. Details are not described again herein.

Optionally, the first network access mode is either of an LTE mode and a Wi-Fi mode, and the second network access mode is one of the LTE mode and the Wi-Fi mode other than the first network access mode. For example, when the first network access mode is the LTE mode, the second network access mode is the Wi-Fi mode; or when the first network access mode is the Wi-Fi mode, the second network access mode is the LTE mode.

Step 302: The terminal device selects, based on the level of the first signal status and the level of the second signal status, the first network access mode from the first network access mode and the second network access mode to perform a service.

Optionally, that the terminal device selects the first network access mode to perform the service may specifically include the following three cases:

First case: When determining that the level of the first signal status is higher than the level of the second signal status, the terminal device selects the first network access mode to perform the service.

For example, when the level of the first signal status is excellent, and the level of the second signal status is poor, the terminal device selects the first network access mode to perform the service; or when the level of the first signal status is excellent, and the level of the second signal status is good, the terminal device selects the first network access mode to perform the service.

Second case: When determining that the level of the first signal status is the same as the level of the second signal status, the terminal device selects the first network access mode of a higher priority to perform the service.

For example, when the first network access mode is the Wi-Fi mode, and the second network access mode is the LTE mode, and the Wi-Fi mode has a higher priority than the LTE mode, after determining that both the level of the first signal status and the level of the second signal status are excellent, the terminal device selects the Wi-Fi mode to perform the service.

Third case: When determining that the level of the second signal status is not in a specified level range and that the level of the first signal status is higher than the level of the second signal status, the terminal device selects the first network access mode to perform the service.

The specified level range may be excellent and good, or may be relatively high levels after the levels are classified according to other rules.

Optionally, before or when the terminal device performs the service, the terminal device may select, by using the method in the three cases, the first network access mode to perform the service.

For example, after the terminal device selects, by using the method in the first case or the second case, the LTE mode to perform the service, the terminal device determines that the level of the signal status in the LTE mode is poor and is not in the specified level (excellent and good) range, and the terminal device determines that the level of the signal status in the Wi-Fi mode is excellent, that is, the level is higher than the level of the signal status in the LTE mode. In this case, the terminal device switches the network access mode from the LTE mode to the Wi-Fi mode, that is, selects the Wi-Fi mode to perform the service.

Optionally, when the terminal device is performing the service in the second network access mode, when the level of the second signal status is good (that is, in the specified level range), even if the level of the first signal status is excellent, the terminal device keeps the network access mode unchanged, and continues to select the second network access mode to perform the service.

Optionally, the specific process in which the terminal device selects the first network access mode to perform the service may include the following two steps:

A. The terminal device selects a target access point from a plurality of access points using the first network access mode, where the target access point is an access point having a largest quality of service parameter, in the plurality of access points, and a quality of service parameter of any access point is used to indicate quality of the service performed by the terminal device by using the access point.

B. The terminal device accesses the target access point, and performs the service by using the target access point.

Optionally, after the terminal device performs step B, the terminal device determines whether the service is completed by using the target access point, and updates the quality of service parameter of the target access point based on a determining result. This specifically includes:

when determining that the service is completed by using the target access point, the terminal device adds a fixed value to the quality of service parameter of the target access point; or when determining that the service is not completed by using the target access point, the terminal device subtracts a fixed value from the quality of service parameter of the target access point.

For example, when the target access point is an access point having a largest quality of service parameter, in a plurality of access points using the Wi-Fi mode, after the terminal device accesses the target access point and performs a voice service by using the target access point, after the terminal device determines that the voice service is completed by using the target access point, that is, after a call succeeds, the terminal device adds 10 to the quality of service parameter of the target access point; or after the terminal device determines that a call fails in a process of performing the voice service by using the target access point and cannot continue to perform the voice service, the terminal device subtracts 10 from the quality of service parameter of the target access point; or after the terminal device determines, in a process of performing the voice service by using the target access point, that the terminal device switches from the Wi-Fi mode to the LTE mode and subsequently continues to perform the voice service by using an access point having a largest quality of service parameter, in a plurality of access points using the LTE mode, the terminal device subtracts 10 from the quality of service parameter of the target access point.

In the method, by updating the quality of service parameter of the target access point, the terminal device may subsequently select an access point of better quality of service based on the quality of service parameter, so as to ensure quality of the service and improve user experience.

In the method for selecting a network access mode by a terminal device according to this embodiment of this application, when determining that the data transmission quality parameters acquired in the n first periods fall within the first range, the terminal device determines that the signal status in the target network access mode is on the first level, where the target network access mode is the first network access mode or the second network access mode; then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point; after determining the level of the first signal status in the first network access mode and the level of the second signal status in the second network access mode by using the method, the terminal device selects the first network access mode from the first network access mode and the second network access mode to perform the service. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of a service performed by the terminal device is finally ensured.

Figure 4:
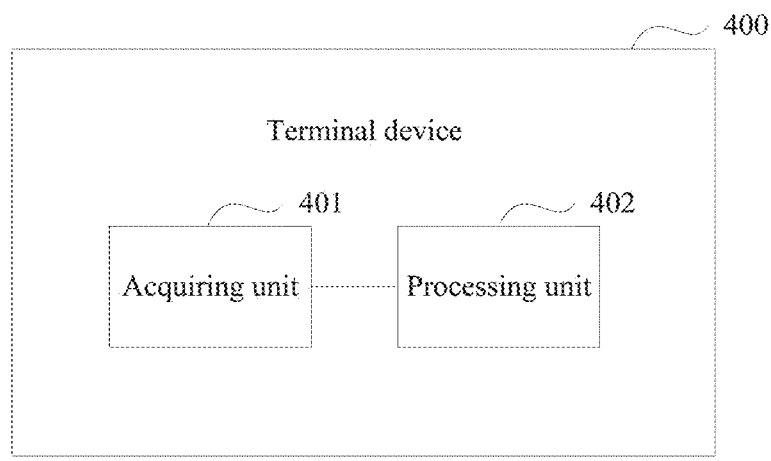
FIG. 4 is a schematic structural diagram of a terminal device according to an embodiment of this application.

Based on the foregoing embodiment, an embodiment of this application further provides a terminal device. The terminal device is applied to the mobile communications system shown in FIG. 1, and is configured to implement the method for determining a signal status of a terminal device as shown in FIG. 2. Referring to FIG. 4, the terminal device 400 includes an acquiring unit 401 and a processing unit 402, where the acquiring unit 401 is configured to acquire a data transmission quality parameter in a network access mode based on a specified period, where the data transmission quality parameter is used to indicate quality of data transmitted in the network access mode; and the processing unit 402 is configured to: when n first data transmission quality parameters fall within a first range, determine that a signal status in the network access mode is on a first level, where the n first data transmission quality parameters are data transmission quality parameters acquired in n first periods, and n is a positive integer; and when m second data transmission quality parameters fall within a first hysteresis range, keep the signal status on the first level, where the m second data transmission quality parameters are data transmission quality parameters acquired in m second periods, m is a positive integer, the second period is a period after the first period, and the first hysteresis range is obtained through external extension based on the first range by using an endpoint of the first range as a start point.

Optionally, the processing unit 402 is further configured to:

when the m second data transmission quality parameters fall within a second range, switch the signal status from the first level to a second level, where no intersection exists between the second range and the first hysteresis range.

Optionally, the processing unit 402 is further configured to:

when p third data transmission quality parameters fall within a second hysteresis range, keep the signal status on the second level, where the p third data transmission quality parameters are data transmission quality parameters acquired in p third periods, p is a positive integer, the third period is a period after the second period, and the second hysteresis range is obtained through external extension based on the second range by using an endpoint of the second range as a start point.

Optionally, a duration of the period is shorter than 300 milliseconds.

Optionally, the network access mode is a Long Term Evolution LTE mode or a Wireless Fidelity Wi-Fi mode.

Optionally, the data transmission quality parameter is a signal strength or a bit error rate.

When determining that the data transmission quality parameters acquired in the n first periods fall within the first range, the terminal device provided by this embodiment of this application determines that the signal status in the network access mode is on the first level; and then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pang effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of a service performed by the terminal device is finally ensured.

Figure 5:
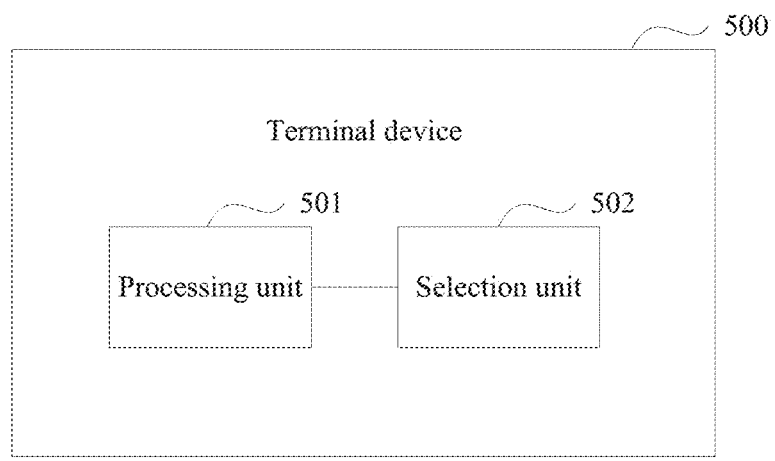
FIG. 5 is a schematic structural diagram of another terminal device according to an embodiment of this application.

Based on the foregoing embodiment, an embodiment of this application further provides another terminal device. The terminal device is applied to the mobile communications system shown in FIG. 1, and is configured to implement the method for selecting a network access mode by a terminal device as shown in FIG. 3. Referring to FIG. 5, the terminal device 500 includes a processing unit 501 and a selection unit 502.

The processing unit 501 is configured to determine a level of a first signal status in a first network access mode and a level of a second signal status in a second network access mode. The processing unit 501 is specifically configured to:

acquire a data transmission quality parameter in a target network access mode based on a specified period, where the data transmission quality parameter is used to indicate quality of data transmitted in the target network access mode, and the target network access mode is the first network access mode or the second network access mode;

when n first data transmission quality parameters fall within a first range, determine that a signal status in the target network access mode is on a first level, where the n first data transmission quality parameters are data transmission quality parameters acquired in n first periods, and n is a positive integer; and when m second data transmission quality parameters fall within a first hysteresis range, keep the signal status on the first level, where the m second data transmission quality parameters are data transmission quality parameters acquired in m second periods, m is a positive integer, the second period is a period after the first period, and the first hysteresis range is obtained through external extension based on the first range by using an endpoint of the first range as a start point.

The selection unit 502 is configured to select, based on the level of the first signal status and the level of the second signal status, the first network access mode from the first network access mode and the second network access mode to perform a service.

Optionally, the processing unit 501 is further configured to:

when the m second data transmission quality parameters fall within a second range, switch the signal status from the first level to a second level, where no intersection exists between the second range and the first hysteresis range.

Optionally, the processing unit 501 is further configured to:

when p third data transmission quality parameters fall within a second hysteresis range, keep the signal status on the second level, where the p third data transmission quality parameters are data transmission quality parameters acquired in p third periods, p is a positive integer, the third period is a period after the second period, and the second hysteresis range is obtained through external extension based on the second range by using an endpoint of the second range as a start point.

Optionally, a duration of the period is shorter than 300 milliseconds.

Optionally, the first network access mode is either of a Long Term Evolution LTE mode and a Wireless Fidelity Wi-Fi mode, and the second network access mode is one of the LTE mode and the Wi-Fi mode other than the first network access mode.

Optionally, the data transmission quality parameter is a signal strength or a bit error rate.

Optionally, when selecting the first network access mode to perform the service, the selection unit 502 is specifically configured to:

determine that the level of the first signal status is higher than the level of the second signal status; and select the first network access mode to perform the service.

Optionally, when selecting the first network access mode to perform the service, the selection unit 502 is specifically configured to:

determine that the level of the first signal status is the same as the level of the second signal status; and select the first network access mode of a higher priority to perform the service.

Optionally, when selecting the first network access mode to perform the service, the selection unit 502 is specifically configured to:

determine that the level of the second signal status is not in a specified level range and that the level of the first signal status is higher than the level of the second signal status; and select the first network access mode to perform the service.

Optionally, when selecting the first network access mode to perform the service, the selection unit 502 is specifically configured to:

select a target access point from a plurality of access points using the first network access mode, where the target access point is an access point having a largest quality of service parameter, in the plurality of access points, and a quality of service parameter of any access point is used to indicate quality of the service performed by the terminal device by using the access point; and access the target access point, and perform the service by using the target access point.

Optionally, the processing unit 501 is further configured to:

when determining that the selection unit 502 completes the service by using the target access point, add a fixed value to the quality of service parameter of the target access point; or when determining that the selection unit 502 does not complete the service by using the target access point, subtract a fixed value from the quality of service parameter of the target access point.

When determining that the data transmission quality parameters acquired in the n first periods fall within the first range, the terminal device provided by this embodiment of this application determines that the signal status in the target network access mode is on the first level, where the target network access mode is the first network access mode or the second network access mode; then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point; after determining the level of the first signal status in the first network access mode and the level of the second signal status in the second network access mode by using the method, the terminal device selects the first network access mode from the first network access mode and the second network access mode to perform the service. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of the service performed by the terminal device is finally ensured.

It should be noted that, division of units in the embodiments of this application is merely an example, and is only division of logical functions. Other division manners may be available in actual implementations. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 6:
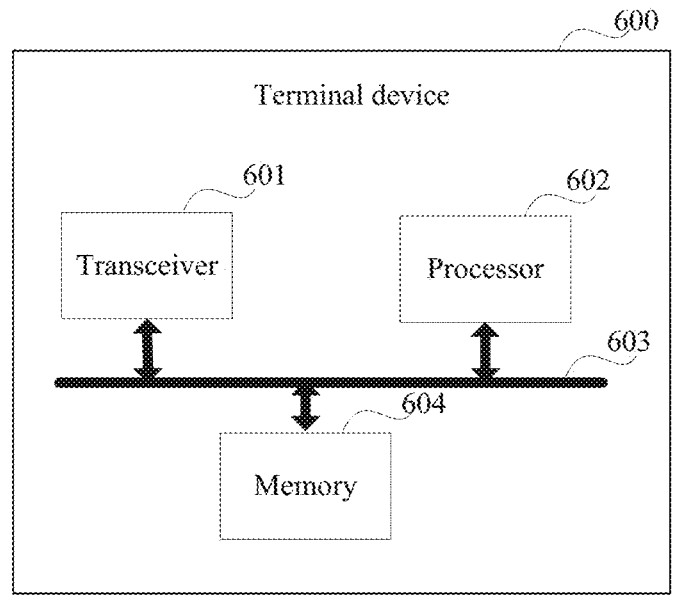
FIG. 6 is a structural diagram of a terminal device according to an embodiment of this application.

Based on the foregoing embodiment, an embodiment of this application further provides a terminal device. The terminal device is applied to the mobile communications system shown in FIG. 1, and is configured to implement the method for determining a signal status of a terminal device as shown in FIG. 2. Referring to FIG. 6, the terminal device 600 includes a processor 602 and a memory 604.

The processor 602 is configured to implement the method for determining a signal status of a terminal device as shown in FIG. 2, including:

acquiring a data transmission quality parameter in a network access mode based on a specified period, where the data transmission quality parameter is used to indicate quality of data transmitted in the network access mode;

when n first data transmission quality parameters fall within a first range, determining that a signal status in the network access mode is on a first level, where the n first data transmission quality parameters are data transmission quality parameters acquired in n first periods, and n is a positive integer; and when m second data transmission quality parameters fall within a first hysteresis range, keeping the signal status on the first level, where the m second data transmission quality parameters are data transmission quality parameters acquired in m second periods, m is a positive integer, the second period is a period after the first period, and the first hysteresis range is obtained through external extension based on the first range by using an endpoint of the first range as a start point.

Optionally, the processor 602 is further configured to:

when the m second data transmission quality parameters fall within a second range, switch the signal status from the first level to a second level, where no intersection exists between the second range and the first hysteresis range.

Optionally, the processor 602 is further configured to:

when p third data transmission quality parameters fall within a second hysteresis range, keep the signal status on the second level, where the p third data transmission quality parameters are data transmission quality parameters acquired in p third periods, p is a positive integer, the third period is a period after the second period, and the second hysteresis range is obtained through external extension based on the second range by using an endpoint of the second range as a start point.

Optionally, a duration of the period is shorter than 300 milliseconds.

Optionally, the network access mode is a Long Term Evolution LTE mode or a Wireless Fidelity Wi-Fi mode.

Optionally, the data transmission quality parameter is a signal strength or a bit error rate.

The memory 604 is configured to store a program or the like. Specifically, the program may include program code, and the program code includes a computer operation instruction. The memory 604 may include a RAM, or may further include a non-volatile memory (non-volatile memory), for example, at least one disk storage. The processor 602 executes the application program stored in the memory 604 to implement the foregoing function to implement the method for determining a signal status of a terminal device as shown in FIG. 2.

The processor 602 and the memory 604 are interconnected. Optionally, the processor 602 and the memory 604 may be interconnected by a bus 603 shown in FIG. 6. The bus 603 may be a peripheral component interconnect standard (peripheral component interconnect, PCI) bus or an extended industry standard architecture (extended industry standard architecture, EISA) bus, or the like. The bus may be classified into an address bus, a data bus, a control bus, and the like. For ease of representation, only one thick line is used to represent the bus in FIG. 6, but this does not mean that there is only one bus or only one type of bus.

Optionally, the terminal device 600 may further include a transceiver 601 interconnected to the processor 602 and the memory 604 by the bus 603. The transceiver 601 is configured to communicate and interact with another device in the mobile communications system.

When determining that the data transmission quality parameters acquired in the n first periods fall within the first range, the terminal device provided by this embodiment of this application determines that the signal status in the network access mode is on the first level; and then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of a service performed by the terminal device is finally ensured.

Figure 7:
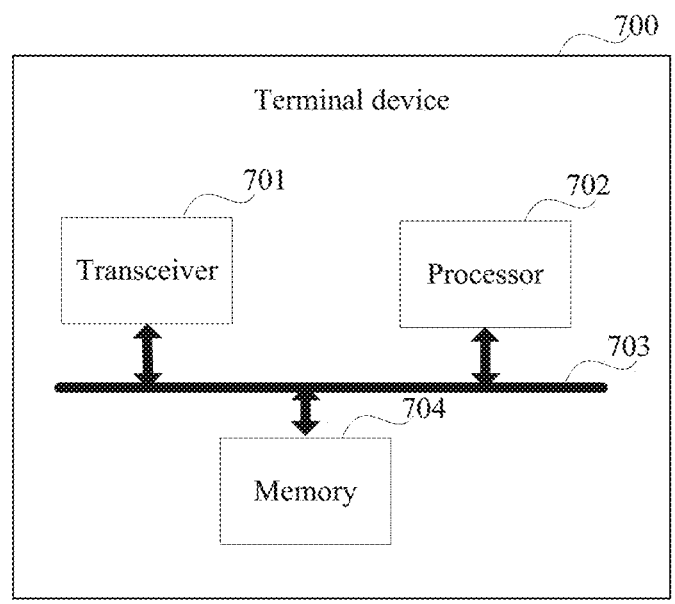
FIG. 7 is a structural diagram of another terminal device according to an embodiment of this application.

Based on the foregoing embodiment, an embodiment of this application further provides another terminal device. The terminal device is applied to the mobile communications system shown in FIG. 1, and is configured to implement the method for selecting a network access mode by a terminal device as shown in FIG. 3. Referring to FIG. 7, the terminal device 700 includes a processor 702 and a memory 704.

The processor 702 is configured to implement the method for selecting a network access mode by a terminal device as shown in FIG. 3, including:

determining a level of a first signal status in a first network access mode and a level of a second signal status in a second network access mode; where the processor acquires a data transmission quality parameter in a target network access mode based on a specified period, where the data transmission quality parameter is used to indicate quality of data transmitted in the target network access mode, and the target network access mode is the first network access mode or the second network access mode;

when n first data transmission quality parameters fall within a first range, the processor determines that a signal status in the target network access mode is on a first level, where the n first data transmission quality parameters are data transmission quality parameters acquired in n first periods, and n is a positive integer; and when m second data transmission quality parameters fall within a first hysteresis range, the processor keeps the signal status on the first level, where the m second data transmission quality parameters are data transmission quality parameters acquired in m second periods, m is a positive integer, the second period is a period after the first period, and the first hysteresis range is obtained through external extension based on the first range by using an endpoint of the first range as a start point; and selecting, based on the level of the first signal status and the level of the second signal status, the first network access mode from the first network access mode and the second network access mode to perform a service.

Optionally, the processor 702 is further configured to:

when the m second data transmission quality parameters fall within a second range, switch the signal status from the first level to a second level, where no intersection exists between the second range and the first hysteresis range.

Optionally, the processor 702 is further configured to:

when p third data transmission quality parameters fall within a second hysteresis range, keep the signal status on the second level, where the p third data transmission quality parameters are data transmission quality parameters acquired in p third periods, p is a positive integer, the third period is a period after the second period, and the second hysteresis range is obtained through external extension based on the second range by using an endpoint of the second range as a start point.

Optionally, a duration of the period is shorter than 300 milliseconds.

Optionally, the first network access mode is either of a Long Term Evolution LTE mode and a Wireless Fidelity Wi-Fi mode, and the second network access mode is one of the LTE mode and the Wi-Fi mode other than the first network access mode.

Optionally, the data transmission quality parameter is a signal strength or a bit error rate.

Optionally, when selecting the first network access mode to perform the service, the processor 702 is specifically configured to:

determine that the level of the first signal status is higher than the level of the second signal status; and select the first network access mode to perform the service.

Optionally, when selecting the first network access mode to perform the service, the processor 702 is specifically configured to:

determine that the level of the first signal status is the same as the level of the second signal status; and select the first network access mode of a higher priority to perform the service.

Optionally, when selecting the first network access mode to perform the service, the processor 702 is specifically configured to:

determine that the level of the second signal status is not in a specified level range and that the level of the first signal status is higher than the level of the second signal status; and select the first network access mode to perform the service.

Optionally, when selecting the first network access mode to perform the service, the processor 702 is specifically configured to:

select a target access point from a plurality of access points using the first network access mode, where the target access point is an access point having a largest quality of service parameter, in the plurality of access points, and a quality of service parameter of any access point is used to indicate quality of the service performed by the terminal device by using the access point; and access the target access point, and perform the service by using the target access point.

Optionally, the processor 702 is further configured to:

when determining that the service is completed by using the target access point, add a fixed value to the quality of service parameter of the target access point; or when determining that the service is not completed by using the target access point, subtract a fixed value from the quality of service parameter of the target access point.

The memory 704 is configured to store a program or the like. Specifically, the program may include program code, and the program code includes a computer operation instruction. The memory 704 may include a RAM, or may further include a non-volatile memory (non-volatile memory), for example, at least one disk storage. The processor 702 executes the application program stored in the memory 704 to implement the foregoing function to implement the method for selecting a network access mode by a terminal device as shown in FIG. 3.

The processor 702 and the memory 704 are interconnected. Optionally, the processor 702 and the memory 704 may be interconnected by a bus 703 shown in FIG. 7. The bus 703 may be a peripheral component interconnect standard (peripheral component interconnect, PCI) bus or an extended industry standard architecture (extended industry standard architecture, EISA) bus, or the like. The bus may be classified into an address bus, a data bus, a control bus, and the like. For ease of representation, only one thick line is used to represent the bus in FIG. 7, but this does not mean that there is only one bus or only one type of bus.

Optionally, the terminal device 700 may further include a transceiver 701 interconnected to the processor 702 and the memory 704 by the bus 703. The transceiver 701 is configured to communicate and interact with another device in the mobile communications system.

When determining that the data transmission quality parameters acquired in the n first periods fall within the first range, the terminal device provided by this embodiment of this application determines that the signal status in the target network access mode is on the first level, where the target network access mode is the first network access mode or the second network access mode; then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point; after determining the level of the first signal status in the first network access mode and the level of the second signal status in the second network access mode by using the method, the terminal device selects the first network access mode from the first network access mode and the second network access mode to perform the service. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of the service performed by the terminal device is finally ensured.

In conclusion, by using the method and apparatus for determining a signal status of a terminal device according to the embodiments of this application, when determining that he data transmission quality parameters acquired in the n first periods fall within the first range, the terminal device determines that the signal status in the network access mode is on the first level; and then when determining that the data transmission quality parameters acquired in the m second periods after the n first periods fall within the first hysteresis range, the terminal device continues to keep the signal status on the first level, where the first hysteresis range is obtained through external extension based on the first range by using the endpoint of the first range as the start point. In the method, after determining that the signal status is on the first level, the terminal device determines a subsequent level of the signal status based on the first hysteresis range. Because the first hysteresis range is obtained through extension based on the first range, the method can prolong a time of keeping the signal status on the first level, and when the data transmission quality parameter frequently changes around the endpoint of the first range, avoid frequent switching of the signal status determined by the terminal device, between two levels. In the method, a ping-pong effect caused by frequent switching of the signal status can be avoided. Further, in a scenario in which the terminal device selects a network access mode based on levels of signal statuses in a plurality of network access modes, frequent switching between the network access modes that is caused by frequent switching of the signal status is avoided, and quality of the service performed by the terminal device is finally ensured.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method for determining a signal status for a mobile device and implemented by the mobile device, the method comprising:
   acquiring first data transmission quality parameters for a network access mode during first periods;
   determining whether the first data transmission quality parameters fall within a first range;
   when the first data transmission quality parameters fall within the first range:
   assigning a signal status level of the network access mode for the mobile device as a first signal status level based on the first data transmission quality parameters falling within the first range;
   acquiring second data transmission quality parameters for the network access mode during second periods;
   obtaining a hysteresis range using an endpoint of the first range as a starting point of the hysteresis range, wherein the hysteresis range is outside of the first range; and
   keeping the signal status level of the network access mode for the mobile device as the first signal status level when the second data transmission quality parameters fall within the hysteresis range, wherein the second periods are after the first periods.

2. The method of claim 1, further comprising:
   determining whether the first data transmission quality parameters fall within a second range that overlaps the hysteresis range;
   when the first data transmission quality parameters fall within the second range:
   assigning the signal status level of the network access mode for the mobile device as a second signal status level based on the first data transmission quality parameters falling within the second range;
   obtaining a second hysteresis range using an endpoint of the second range as a starting point of the second hysteresis range, wherein the second hysteresis range is outside of the second range and overlaps the first range; and
   keeping the signal status level of the network access mode for the mobile device as the second signal status level when the second data transmission quality parameters fall within the second hysteresis range.

3. The method of claim 1, wherein the first data transmission quality parameters are signal strengths or bit error rates.

4. A method for selecting a network access mode and implemented by a mobile device, the method comprising:
   acquiring first data transmission quality parameters in a target network access mode during first periods, wherein the first data transmission quality parameters indicate a first quality of first data transmitted in the target network access mode;
   assigning a signal status level for the target network access mode is as a first signal status level based on the first data transmission quality parameters falling within a first range;
   acquiring second data transmission quality parameters in the target network access mode during second periods;
   obtaining a hysteresis range using an endpoint of the first range as a starting point of the hysteresis range, wherein the hysteresis range is outside of the first range;
   keeping the signal status level as the first signal status level when the second data transmission quality parameters fall within the hysteresis range, wherein the second periods are after the first periods; and
   selecting, based on the signal status level of the target network access mode and a second signal status level of a second signal status of a second network access mode, the target network access mode to perform a service.

5. The method of claim 4, further comprising switching the signal status level from the first signal status level to a different level when the second data transmission quality parameters fall within a second range, wherein the second range and the hysteresis range do not intersect.

6. The method of claim 4, wherein the target network access mode is a Long-Term Evolution (LTE) mode, and wherein the second network access mode is a Wi-Fi mode.

7. The method of claim 4, wherein the first data transmission quality parameters are signal strengths or bit error rates.

8. The method of claim 4, further comprising further selecting the target network access mode to perform the service when the first signal status level is higher than the second signal status level.

9. The method according to claim 4, further comprising further selecting the target network access mode to perform the service when the first signal status level is the same as the second signal status level.

10. The method of claim 4, further comprising further selecting the target network access mode to perform the service when the second signal status level is not in a level range and the first signal status level is higher than the second signal status level.

11. The method of claim 4, further comprising:
    selecting, from among a plurality of access points using the target network access mode, a target access point with a largest quality of service parameter;
    accessing the target access point; and
    performing the service using the target access point.

12. The method of claim 11, further comprising adding a fixed value to the largest quality of service parameter.

13. The method of claim 11, wherein the largest quality of service parameter indicates a quality of service provided by the mobile device using the target access point.

14. A mobile device comprising:
    a memory; and
    a processor coupled to the memory and configured to:
      acquire first data transmission quality parameters in a target network access mode during first periods, wherein the first data transmission quality parameters indicate a first quality of first data transmitted in the target network access mode;
      assign a signal status level for the target network access mode is as a first signal status level based on the first data transmission quality parameters fail falling within a first range;
      acquire second data transmission quality parameters in the target network access mode during second periods;
      obtain a hysteresis range using an endpoint of the first range as a starting point of the hysteresis range, wherein the hysteresis range is outside of the first range;
      keep the signal status level as the first signal status level when the second data transmission quality parameters fall within the hysteresis range, wherein the second periods are after the first periods; and
      select, based on the signal status level of the target network access mode and a second signal status level of a second signal status of a second network access mode, the target network access mode to perform a service.

15. The mobile device of claim 14, wherein the processor is further configured to switch the signal status level for the target network access mode from the first signal status level to a different signal status level when the second data transmission quality parameters fall within a second range, and wherein the second range and the hysteresis range do not intersect.

16. The mobile device of claim 14, wherein the processor is further configured to further select the target network access mode to perform the service when the first signal status level is higher than the second signal status level.

17. The mobile device of claim 14, wherein the processor is further configured to further select the target network access mode to perform the service when the first signal status level is the same as the second signal status level.

18. The mobile device of claim 14, wherein the processor is further configured to further select the target network access mode to perform the service when the second signal status level is not in a specified level range and the first signal status level is higher than the second signal status level.

19. The mobile device of claim 14, wherein the processor is further configured to:
    select, from among a plurality of access points using the target network access mode, a target access point with a largest quality of service parameter;
    access the target access point; and
    perform the service using the target access point.

20. The mobile device of claim 14, wherein the target network access mode is a Long-Term Evolution (LTE) mode, and wherein the second network access mode is a Wi-Fi mode.

* * * * *